March 9, 1971 J. E. PASCENTE 3,569,999
A.C. CONTROL CIRCUIT
Filed Oct. 18, 1968

INVENTOR
JOSEPH E. PASCENTE

Anderson, Luedeka, Fitch, Even & Tabin
ATTYS.

United States Patent Office 3,569,999
Patented Mar. 9, 1971

3,569,999

A.C. CONTROL CIRCUIT

Joseph E. Pascente, Norridge, Ill., assignor to Grigsby-Barton, Inc., Arlington Heights, Ill.

Filed Oct. 18, 1968, Ser. No. 768,701
Int. Cl. H03k *17/00*
U.S. Cl. 307—252 16 Claims

ABSTRACT OF THE DISCLOSURE

A zero-voltage A.C. switching circuit operates synchronously with the line, and may be used to control the application and removal of power to or from a highly reactive load, as well as a resistive load, without loss of synchronism or switch control.

Figure 1:
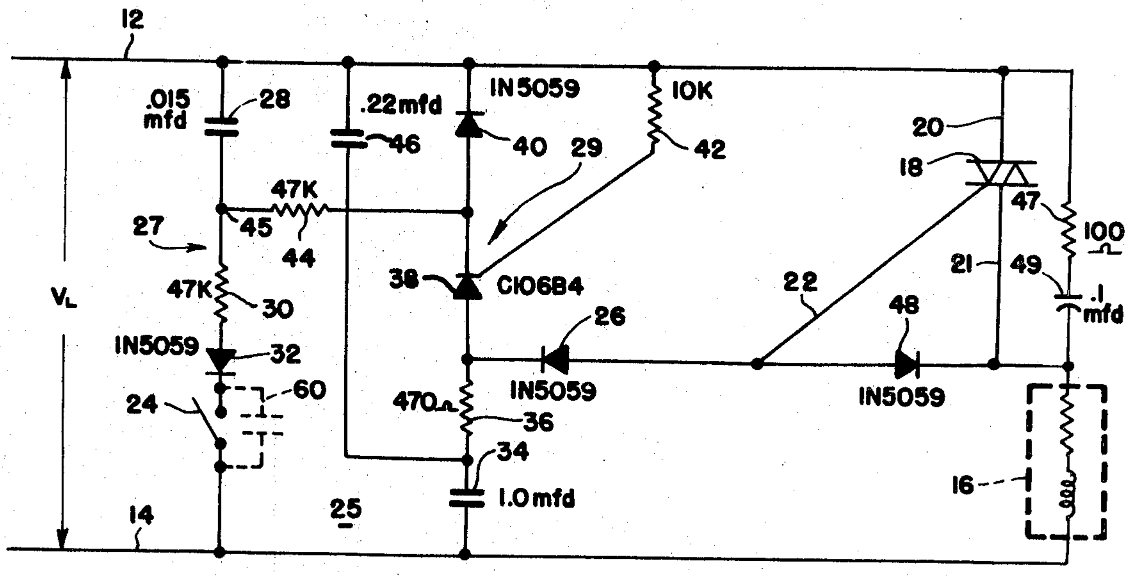

The present invention relates to zero-voltage A.C. switching circuits, and particularly to such circuits employing a triac or other thyristor element or elements arranged for bidirectional operation.

The term "triac" is generically used to identify a triode or three electrode A.C. semi-conductor switch which is triggered into conduction by a gate signal in a manner somewhat similar to the action of a silicon controlled rectifier (SCR), but which differs therefrom in that it can conduct in both directions of current flow in response to a positive or negative gate signal. Such devices are now well known and commonly used in various types of switching circuits, and have heretofore been employed in A.C. synchronous switching circuits of the zero-voltage type. Such circuits are generally utilized as a substitute for a mechanical switch or an electromechanical relay to eliminate various problems generally associated with these components, such as contact sticking, bounce, burning, etc., as well as for the reduction of arcing, transient voltages, and radio freqency interference. These circuits typically contain a primary or control switching device, such as a switch or reed relay, which is actuated at any time, not corresponding to any particular point of the line voltage; however, due to the inherent characteristic of the triac, it will become conductive, with proper triggering, at the zero voltage points and will become non-conductive when the current through the device becomes zero (or less than the required holding value) and the triggering current is removed and hence, such devices, are conveniently used in A.C. zero-voltage switching circuits.

While the above circuits, in their simplest form, may be used to switch resistive loads by merely connecting the triac load terminals in series with the load, and by providing a suitable triggering current to the triac gate, when an inductive load is involved, certain problems generally arise which are not otherwise present. Where, for example, an inductive load is connected to such a switching circuit, the current lags the voltage and thus reaches zero some time after the voltage has reached a value in the opposite polarity on each cycle. The triac would normally open or become non-conductive at zero current, but in this case, the instantaneous line voltage appears across the triac at a rate limited only by the stray capacitance and the capacitance of the triac itself. It is a characteristic of the triac that a fast voltage rise with respect to time, generally termed "commutation *dv/dt*," impressed across the load terminals, tends to prevent the triac from opening. Therefore, in its operation with an inductive load, the voltage magnitude which is present across the triac rises abruptly to the line voltage during the zero current periods, tending to prevent the triac from turning off. In order to minimize these effects for any particular *dv/dt* rated device, various circuit techniques have been proposed, the simplest of which is probably to increase the capacitance in the circuit to limit the rate of voltage rise, and to provide resistance in the circuit to minimize or prevent ringing currents. However, with certain types of loads, such prior switching circuits may not function properly, even though no commutation problem appears to exist. For example, where such a circuit is connected to an inductive load such as a transformer having its secondary winding connected to a capacitor-bank charging circuit, it is generally desirable to apply initial power to the transformer only when the line voltage is zero so as to avoid extremely large surge currents as the capacitors initially charge. With a large lagging power factor load, such prior switching circuits may lose synchronism with the line so that the switching is aperiodic; and further, once started by closing the control switch, the circuit may continue such aperiodic operation with complete loss of control through the control switch, even though the rate of voltage rise is within the *dv/dt* ratings of the triac.

Accordingly, it is an object of the present invention to provide an improved A.C. zero-voltage switching circuit which has the capability of reliable operation with such inductive loads, as well as with resistive loads.

It is another object of the invention to provide such a switching circuit which has the capability of switching relatively high rated voltages and currents, even though it is connected to such an inductive load.

It is a further object of the invention to provide such a switching circuit which is light, employs relatively few components, and which may be constructed so as to occupy a relatively small space.

Figure 2:
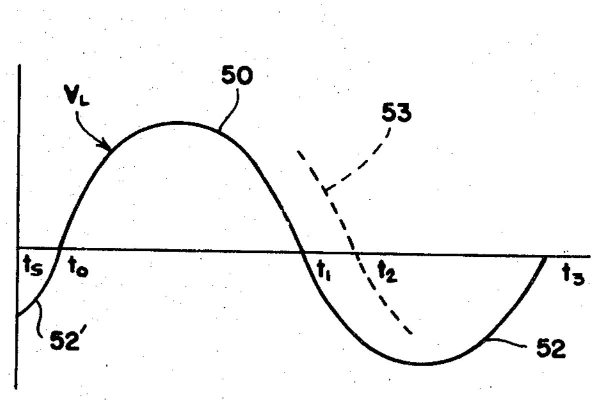

These and other objects and advantages of the invention are more particularly set forth in the following detailed description of a preferred embodiment, and in the accompanying drawings of which:

FIG. 1 is a schematic diagram showing a preferred embodiment of the circuit in accordance with the present invention; and FIG. 2 is a graphical representation showing the waveforms at certain points of the circuit illustrated in FIG. 1.

Referring now to FIG. 1, there is shown a switching circuit for controlling the application of a two-terminal A.C. source, illustrated as voltage $V_L$ across lines 12 and 14, to a load 16. The lead 16, in connection with the present embodiment of the invention, is of an inductive nature, including inductance and resistance, and thus produces a lagging current characteristic with respect to the voltage thereacross. A bidirectional semi-conductor switching means, illustrated as triac 18, has anode and cathode load terminals 20 and 21 and a gate or control terminal 22. The triac 18 is connected in the circuit with the cathode 21 connected to one side of the load 16 and the anode 20 connected to the A.C. line 12. The other side of the load 16 is connected to the other A.C. line 14, so that the triac 18 and load 16 form a series circuit combination connected across the A.C. lines. The triac 18 is normally non-conductive or off, but upon closure of a control switch 24 a control circuit 25 causes the triac 18 to become conductive at the next 0° zero-crossing of the line voltage, applying the line voltage to the load 16. Thereafter, the triac 18 is conductive during every half-cycle of the line voltage as long as the control switch 24 remains in its closed condition. When the control switch 24 is placed in its open condition, the triac 18 becomes non-conductive at the next 0° zero-crossing of the load current. The circuit will switch synchronously with the A.C. line at zero-voltage points or retain its conductive condition even though there is a lagging load current, until the control switch is opened.

A unidirectionally conductive device, illustrated as diode 26, interconnects the control circuit 25 and the gate or control electrode 22 of the triac 18 to provide reliable circuit operation with an inductive load in a manner to be hereinafter described. Additionally, certain other features, also to be later described, permit such reliable operation at line voltages only limited by the voltage ratings of the components, and thus the circuit operation is not deleteriously affected by its connection to and control of the inductive load 16.

More particularly, the control circuit 25 comprises a selectively operable phase-shifting branch 27, including a phase-shifting capacitor 28 serially connected from the A.C. line 12 to a resistor 30 which, in turn, is connected in series with a rectifier diode 32 and the control switch 24 to the other A.C. line 14. The rectifier diode 32 is poled, as shown, so as to allow the phase-shifting capacitor 28 to retain a charge of suitable polarity for proper operation of the control circuit 25.

A trigger branch 29 is also connected across the A.C. lines 12 and 14, and includes the series connection of latching capacitor 34 connected to line 14, a current limiting resistor 36, the load terminals of a silicon controlled rectifier (SCR) 38 and a clamping rectifier diode 40 having its cathode connected to the A.C. line 12. The SCR 38 is poled so that its anode is connected to the limiting resistor 36 and its cathode is connected to the anode of the clamping diode 40. The control or gate electrode of the SCR 38 is coupled to the A.C. line 12 by means of a bias resistor 42. A coupling resistor 44 connects the phase-shifting branch 27 to the trigger branch 29, and is connected from the junction of the phase-shifting capacitor 28 and the resistor 30 to the cathode of the SCR 38.

Capacitance means, illustrated as capacitor 46, is connected from the A.C. line 12 to the junction of latching capacitor 34 and resistor 36 for reducing the blocking *dv/dt* across the SCR 38 so that it will remain non-conductive until the proper relative polarity potentials are applied thereto. The diode 26 is coupled from the gate 22 of the triac 18 to the anode of the SCR 38, and is poled so as to provide a conductive path in the direction away from the triac gate and to block current flow in the direction toward the triac gate. A further diode 48 is connected between the triac gate 22 and the triac cathode 21, and is also poled so as to provide a conductive path only in the direction away from the triac gate. This arrangement of diodes, and particularly diode 26, permits synchronous switching operation without loss of control for reasons hereinafter described. Series connected resistor 47 and capacitor 49 in shunt with the triac 18 reduce the *dv/dt* across the triac on switching so that it is below the rating thereof in accordance with well known techniques.

In operation, the A.C. voltage $V_L$ of typically 120 volts r.m.s. is applied to the lines 12 and 14, and this waveform is illustrated in FIG. 2. For purpose of description, line 12 is taken as reference, and thus it is assumed that the half-cycle 50 occurs when line 14 is positive with respect to the line 12, and that the second half-cycle 52 occurs when line 14 is negative with respect to line 12.

When control switch 24 is open, the voltage of line 12 is applied to the cathode of SCR 38 through phase-shifting capacitor 28 and resistor 44, but since the phase-shifting circuit 27 is effectively open, the voltage on the SCR cathode has the same phase as the line voltage, and is, in effect, the voltage on line 12. A voltage approximately or near that of line 14 is applied to the anode of SCR 38 from the junction of capacitor 46 and latching capacitor 34, through resistor 36. Since the latching circuit formed by capacitors 34 and 36 and resistor 36 is also effectively open, the voltage on the SCR anode has the same phase as the line. Consequently, during the positive half-cycle 50, the SCR 38 is non-conductive due to the negative potential applied to the gate via resistor 42 coupled to line 12, even though a forward bias is applied across the SCR load terminals. During the negative half-cycle 52, the SCR remains non-conductive due to the reverse bias applied across the SCR load terminals by the line. Thus, as long as control switch 24 is open, the SCR 38 remains non-conductive, as does the triac 18, since no triggering gate current or voltage is provided to the triac gate 22.

When the control switch 24 is closed at some arbitrary time, e.g., time $t_S$, the phase-shifting circuit 27 produces a lagging voltage at node 45 which is coupled to the SCR cathode through resistor 44. Since the SCR cathode is clamped to line 12 for relatively positive values, the cathode voltage will be approximately the same as the line 12 until the phase-shifted voltage becomes negative relative to line 12, at which time diode 40 will block the line from the cathode. Due to the lagging phase-shift, the SCR cathode becomes negative relative to the anode during the last portion of the preceding negative half-cycle 52'. Although the SCR cathode is then negative relative to the anode, SCR 38 remains non-conductive until the SCR gate becomes sufficiently positive relative to the cathode, and this first occurs when the voltage on the line reaches zero at time $t_0$, which is taken to be zero degrees in the A.C. cycle. At this time, the SCR becomes conductive and a negative potential is applied to the cathode of the diode 26. The voltage on line 14 increases in the positive direction and thus the triac anode 20 is negative with respect to the triac cathode 21. The negative potential applied to the cathode of diode 26 forward biases the diode and applies a negative potential to the triac gate 22, the gate being blocked from the positive potential on the line by the blocking diode 48. Hence, under these conditions, the triac has good sensitivity and switches to a conductive condition at time $t_0$, resulting in substantially the entire line voltage being applied to the load 16 and the voltage across the triac being reduced to a relatively small value of about 1 to 4 volts.

With line 14 positive, as shown by the half-cycle 50 in FIG. 2, and SCR 38 conductive, current flows from line 14 to line 12 through the latching capacitor 34, resistor 36. SCR 38 and diode 40, and the phase-shift produced by the phase-shifting circuit 27 is shifted into coincidence with the line voltage waveform when the SCR 38 becomes conductive. The current through the trigger branch 29 supplies the necessary holding current to retain the SCR 38 in its conductive condition during the positive half-cycle 50 or so long as the load terminals of the SCR are forward biased. Of course, with the proper holding current, once the SCR 38 has been triggered to its conductive state, the potential on its gate has no effect on its condition.

When the voltage on the lines passes through zero at 180° or time $t_1$, the SCR 38 becomes non-conductive and the SCR anode has a negative potential applied thereto by the retained charge on latching capacitor 34 which was so polarized during the previous half-cycle 50. Although the line voltage is zero at time $t_1$, the triac 18 remains conductive because of the lagging current caused by the inductive load 16. Thus, although the line voltage across the triac 18 and load 16 is zero at time $t_1$, a current is still flowing from line 14 to line 12 in the load or triac branch of the circuit, and since this current is greater than the required holding current, the triac 18 will not cut off. However, when the lagging curent 53 reaches zero at some later time, e.g., $t_2$, at which point the triac 18 would ordinarily turn off, it is latched or retained in its conductive condition by the negative potential applied to the cathode of diode 26 by latching capacitor 34. This negative potential is the result of the residual charge on the capacitor 34 during the time just prior to the SCR cut off at time $t_1$, and acts in a similar fashion to a battery to draw gate current from the triac 18 through diode 26, thereby preventing the triac from becoming non-conductive at zero load current, but the negative potential so produced is only transitory because of the charging action of the latching capacitor.

Since the voltage on line 14 is now negative with respect to the line 12, the negative potential on the capacitor 34 is increased in the positive direction as the capacitor 34 becomes charged by the triac gate current and by current through capacitor 46. The triac gate current is formed by an "in phase" component flowing from the anode 20 at line 12 and a lagging load current component still flowing from the triac cathode 21, both of which are permitted to flow to charging capacitor 34 by the polarity of diode 26.

The triac remains conductive during this period and thus the voltage on the triac cathode 21 is substantially the same as that on line 12, being positive relative to line 14 so that the diode 48 blocks current flow between the triac gate 22 and the triac cathode 21. The capacitor 46 is relatively small compared to the latching capacitor 34 to maintain the voltage at the junction therebetween near the voltage of line 14 and to prevent an excessive positive potential from building up on the latching capacitor 34. In addition, the capacitor 46 reduces the blocking *dv/dt* applied to the anode of the SCR 38. This prevents the SCR 38 from being triggered into reconduction by a high *dv/dt* across its load terminals when it abruptly becomes non-conductive and the negative potential appears on its anode. Such a condition may occur if the limiting capacitor 46 were omitted, and the SCR would then fire near every other line voltage maximum or peak, and synchronous operation of the circuit would be possible only with relatively reduced line voltages across lines 12 and 14. By incorporating the limiting capacitor 46 into the latching circuit, as shown, the blocking *dv/dt* on the SCR 38 is substantially reduced, and synchronous circuit operation is made possible at the full rated voltage values of the components.

After time $t_2$, the load current begins increasing in the opposite direction i.e., from line 12 to line 14. As line 14 approaches zero once again from the negative direction, the phase-shifted voltage on the SCR cathode causes the SCR 38 to become conductive at the zero line voltage crossing at 360° or time $t_3$, when the SCR gate becomes positive relative to its cathode. The cathode of the diode 26 drops again to a negative potential and provides a trigger signal for the triac 18. At the same time, an SCR holding current flows from line 14 to line 12 through capacitor 34 and resistor 36 in the same manner as previously described. For a short period after the line voltage goes positive at time $t_3$, a load current component continues to flow in the previous direction from line 12 to line 14.

If control switch 24 is arbitrarily opened, SCR 38 becomes non-conductive when the line applies a reverse bias across its load terminals, and the triac 18 turns off at the next 360° zero crossing of the current. Without diode 26, the lagging current produced by the inductive load 16 would produce a current flow from line 14, through capacitor 34, resistor 36, to the triac gate 22, and thus prevent the triac from turning off. Hence, the use of diode 26 rather than a direct conductive connection enables the control switch 24 to retain control of the circuit.

A diode 32, poled as shown in FIG. 1, is serially connected in the phase-shifting circuit 27 to provide a D.C. pulse operation rather than an A.C. operation so that the sensitivity of the circuit to external or extraneous capacitance effects will be minimized. More particularly, the control switch 24 may be physically located a substantial distance from the switching circuit itself, and the leads from the circuit to the control switch 24 may provide a significant effective capacitance, illustrated by the dotted capacitor 60. If the phase-shifting circuit 27 is operated by an alternating current, the capacitive reactance may become sufficiently low so that the control switch 24 always appears to be closed or shorted, and thus the control switch 24 would not be able to control the circuit. However, by employing the diode 32, for D.C. circuit operation, the capacitive effects of the leads to the switch 24 is reduced sufficiently to assure retention of control by the control switch 24, so that the phase-shifting circuit 27 responds only to a closed switch condition.

A specific circuit construction having the component values shown in FIG. 1 has been found satisfactory for loads having a lagging power factor of 0.6. Any suitable triac may be employed, depending on the circuit characteristics and cost factors desired.

Although the bidirectional switching element of the embodiment illustrated is a triac, two SCR's may alternatively be employed in a back-to-back configuration. Also, a phase-shifting circuit may be employed which provides a leading rather than a lagging voltage so that the SCR will fire at the 180° points rather than at the 0° points, or the same result may be obtained by general component inversion.

Although one specific embodiment has been herein described, various modifications will be apparent to those skilled in the art; and accordingly, the present invention should be defined only by the appended claims, and equivalents thereof.

Various features of the invention are set forth in the following claims.

What is claimed is:

1. A switching circuit for controlling the application of an A.C. source to a load having reactance, comprising first thyristor means having a bidirectional characteristic, said first thyristor means having two load terminals and a control terminal, second thyristor means having two load terminals and a control terminal, circuit means coupling the load terminals and control terminal of said second thyristor means to the A.C. source and including selectively operable phase-shifting means for applying a voltage to one of the load terminals of said second thyristor means which is sufficiently out of phase with respect to the source voltage so that said second thyristor means becomes conductive at one zero source-voltage crossing in each source-voltage cycle, said first thyristor means having one of its load terminals adapted for connection to one terminal of the A.C. source and the other of its load terminals adapted to cause the application of the source voltage to the load when said first thyristor means is in its conductive state, unidirectional conducting means connecting the control terminal of said first thyristor means to the other load terminal of said second thyristor and responsive to the conductive condition of said second thyristor means at said zero voltage crossing to provide a trigger signal of one polarity to said first thyristor means to cause the same to become conductive, said circuit means including energy storage means also coupled to said other load terminal of said second thyristor means for maintaining said trigger signal on the control terminal of said first thyristor means after said second thyristor means is non-conductive, and said unidirectional conducting means being poled so as to permit passage of said trigger signal to said first thyristor means but to block signals of opposite polarity produced by reactive components of load current when said second thyristor means is non-conductive, whereby said first thyristor means is caused to be conductive and non-conductive in synchronism with the source.

2. The switching circuit of claim 1 wherein said energy storage means has one terminal coupled to one terminal of the source and the other terminal coupled to said other load terminal of said second thyristor means, and said circuit further comprises capacitive means coupled from said other storage means terminal to the other terminal of the source.

3. The switching circuit of claim 2 wherein said energy storage means comprises a capacitor having a substantially larger capacitance value than that of said capacitance means.

4. The switching circuit of claim 1 wherein a second unidirectional conducting means is connected between the control terminal of said first thyristor means and the load terminal of said switching circuit, said second unidirectional conducting means being poled so as to prevent said first thyristor means from being triggered asynchronously into conduction by the voltage on the last mentioned load terminal.

5. The switching circuit of claim 4 wherein said second thyristor means comprises a SCR, said circuit comprising conducting means for coupling the other load terminal of said first thyristor means to one terminal of the A.C. source, resistance means coupling the control terminal of said SCR to said conducting means, third unidirectional conducting means connecting the SCR cathode to said conducting means and poled so as to prevent the cathode from becoming significantly positive relative to the potential on said conducting means, said first unidirectional conducting means and said energy storage means being coupled to the SCR anode, and said selectively operable phase-shifting means being coupled to the SCR cathode.

6. The switching circuit of claim 5 wherein said phase-shifting means comprises a series connected capacitor and resistor coupled across the source terminals through a switch, and means coupling the junction of said capacitor and resistor to the SCR cathode, the closure of said switch operating to apply the phase-shifted voltage to the cathode.

7. The switching circuit of claim 6 wherein a fourth unidirectional conducting means is interconnected in said series connection of said phase-shifting means.

8. The switching circuit of claim 5 wherein a resistor is interconnected between the SCR anode and said energy storage means, and a capacitor is connected from the junction of said resistor and said energy storage means to said conducting means.

9. The switching circuit of claim 1 wherein said selectively operable phase-shifting circuit provides a lagging voltage with respect to the source voltage.

10. A switching circuit for controlling the application of an A.C. source to a load having reactance, comprising a pair of terminal lines adapted for connection to the A.C. source, a bidirectional thyristor having two load terminals and a control terminal, a unidirectional thyristor having two load terminals and a control terminal, circuit means coupling the load terminals and control terminal of the unidirectional thyristor to the A.C. terminal lines, said circuit means including phase-shifting means for applying a voltage to one of the terminals of the unidirectional thyristor which is phase-shifted an amount to cause the unidirectional thyristor to become conductive at a zero source-voltage crossing in each source-voltage cycle, the bidirectional thyristor having one of its load terminals coupled to one A.C. terminal line and means for coupling the other of its load terminals to the other A.C. terminal line through the load, and unidirectional conducting means coupling the control terminal of the bidirectional thyristor to one load terminal of the unidirectional thyristor and responsive to the conductive condition of the unidirectional thyristor at said zero source voltage crossing to provide a trigger signal of one polarity to the bidirectional thyristor to cause the bidirectional thyristor to become conductive, said unidirectional conducting means being poled so as to permit passage of said trigger signal to said bidirectonal thyristor but to block signals of opposite polarity thereto produced by reactive signal components derived from said load reactance.

11. The switching circuit of claim 10 further comprising a second unidirectional conducting means coupled between the control terminal of the bidirectional thyristor and the load terminal of said switching circuit, said second unidirectional conducting means being poled in the same direction relative to the control terminal of the bidirectional thyristor as the first-mentioned unidirectional conducting means.

12. The switching circuit of claim 10 further comprising means for selectively applying and not applying said phase-shifted voltage to the unidirectional thyristor to control the actuation and deactuation of said switching circuit.

13. The switching circuit of claim 10 wherein said circuit means further includes means coupled to said one load terminal of the unidirectional thyristor for preventing the maximum potential on said one load terminal from producing asynchronous switching of the unidirectional thyristor.

14. A switching circuit for controlling the application of an A.C. source to a load having reactance, comprising a pair of terminal lines adapted for connection to the A.C. source; a selectively operable phase-shifting circuit branch connected across said pair of terminal lines including a serially connected first resistor, first capacitor, and switch; a trigger circuit branch connected across said pair of terminal lines including a second capacitor, second resistor, silicon controlled rectifier having an anode, cathode and gate terminal, and a first rectifier diode having an anode and cathode, the second capacitor having one side thereof connected to one of the pair of A.C. terminal lines and the other side thereof connected to one side of the second resistor, the other side of the second resistor being connected to the anode of the silicon controlled rectifier, the cathode of the silicon controlled rectifier being connected to the anode of the rectifier diode and the cathode of the rectifier diode being connected to the other of the pair of A.C. terminal lines, a third resistor coupling the gate terminal of the silicon controlled rectifier to said other A.C. terminal line; a fourth resistor connecting the junction of the first resistor and capacitor to the cathode of the silicon controlled rectifier; a triac having a pair of load terminals and a gate terminal, one of said load terminals being coupled to said other A.C. terminal line and the other of said load terminals being so connected as to form a switchable circuit from said one A.C. terminal line, through the load, to said other A.C. terminal line to controllably apply the A.C. source to the load; means coupling the gate terminal of the triac to the anode of the silicon controlled rectifier; and a second rectifier diode having its anode connected to the gate terminal of the triac and its cathode adapted for connection to the load; said switching circuit being characterized in that said means for coupling the gate terminal of the triac to the anode of the silicon controlled rectifier comprises a third rectifier diode having its anode coupled to the triac gate terminal and its cathode coupled to the silicon controlled rectifier anode so that signals produced by reactive components from said load are prevented from asynchronously triggering the triac.

15. The switching circuit of claim 14 further characterized in that a third capacitor is coupled from the junction of the second capacitor and resistor to said other A.C. terminal line.

16. The switching circuit of claim 14 further characterized in that said phase-shifting circuit branch includes a further rectifier diode serially connected with said switch.

References Cited

UNITED STATES PATENTS

| | | | |
|---|---|---|---|
| 3,335,291 | 8/1967 | Gutzwiller. | |
| 3,346,744 | 10/1967 | Howell. | |
| 3,346,874 | 10/1967 | Howell. | |
| 3,446,991 | 5/1969 | Howell. | |
| 3,353,032 | 11/1967 | Morgan. | |
| 3,450,891 | 6/1969 | Riley | 307—252 |

OTHER REFERENCES

Galloway, J. H.: Using the Triac for Control of A.C. Power, G.E. Applications Note 200.35, March 1966, pp. 4, 12 and 15.

DONALD D. FORRER, Primary Examiner

D. M. CARTER, Assistant Examiner